United States Patent
Koshikawa et al.

(10) Patent No.: US 8,440,777 B2
(45) Date of Patent: May 14, 2013

(54) ADDITION-CURE FLUOROPOLYETHER ADHESIVE COMPOSITION

(75) Inventors: Hidenori Koshikawa, Annaka (JP); Mikio Shiono, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 233 days.

(21) Appl. No.: 13/007,134

(22) Filed: Jan. 14, 2011

(65) Prior Publication Data
US 2011/0178263 A1    Jul. 21, 2011

(30) Foreign Application Priority Data

Jan. 19, 2010  (JP) ................. 2010-009201

(51) Int. Cl.
*C08G 77/42* (2006.01)
(52) U.S. Cl.
USPC .................... 528/42; 528/36; 528/31; 528/32
(58) Field of Classification Search ............ 528/42, 528/36, 31, 32
See application file for complete search history.

(56) References Cited

U.S. PATENT DOCUMENTS

| | | | | |
|---|---|---|---|---|
| 4,804,709 A | * | 2/1989 | Takago et al. ............... | 525/102 |
| 5,656,711 A | | 8/1997 | Fukuda et al. | |
| 5,665,846 A | | 9/1997 | Sato et al. | |
| 5,670,560 A | * | 9/1997 | Lower et al. ............... | 523/212 |
| 2005/0277731 A1 | * | 12/2005 | Fukuda et al. .............. | 524/588 |

FOREIGN PATENT DOCUMENTS

| | | |
|---|---|---|
| EP | 0 765 916 B1 | 4/1997 |
| JP | 2990646 | 10/1999 |
| JP | 3239717 | 10/2001 |

* cited by examiner

*Primary Examiner* — Kuo-Liang Peng
(74) *Attorney, Agent, or Firm* — Oblon, Spivak, McClelland, Maier & Neustadt, L.L.P.

(57) ABSTRACT

A fluoropolyether adhesive composition comprising (A) a linear polyfluoro compound having at least two alkenyl groups and a perfluoropolyether structure in its main chain, (B) a fluorinated organohydrogensiloxane containing at least two SiH groups, but not alkoxy and epoxy groups, (C) a platinum group metal-based catalyst, (D) an organosilicon compound having at least one silicon-bonded alkoxy group, and (E) a hydrolytic catalyst can be cured to metal and plastic substrates through addition reaction.

19 Claims, No Drawings

ADDITION-CURE FLUOROPOLYETHER ADHESIVE COMPOSITION

CROSS-REFERENCE TO RELATED APPLICATION

This non-provisional application claims priority under 35 U.S.C. §119(a) on Patent Application No. 2010-009201 filed in Japan on Jan. 19, 2010, the entire contents of which are hereby incorporated by reference.

TECHNICAL FIELD

This invention relates to addition-cure fluoropolyether adhesive compositions which are fully adherent to metal and plastic substrates.

BACKGROUND ART

JP 2990646 discloses a composition comprising a linear fluoropolyether compound having at least two alkenyl groups per molecule and a perfluoropolyether structure in its main chain, a fluorinated organohydrogensiloxane having at least two silicon-bonded hydrogen atoms (i.e., SiH groups) per molecule, and a platinum group compound. The composition cures into a product having a good profile of heat resistance, chemical resistance, solvent resistance, mold release, water repellency, oil repellency, and low-temperature properties.

It is also described that the composition is endowed with self adhesion to metal and plastic substrates by adding thereto an organopolysiloxane having a hydrosilyl group and an epoxy and/or trialkoxysilyl group as a third component. This adhesive composition can be cured by heat, and the cured composition is improved in the properties listed above. The composition is thus used for the bonding purpose in various industrial fields where these properties are required, for example, around electric and electronic components and automobile components (see JP 3239717).

However, when the adhesive composition is cured at temperatures below 150° C., it fails to display self-adhesion to certain substrates. A primer must be used to establish adhesion therebetween.

CITATION LIST

Patent Document 1: JP 2990646
Patent Document 2: JP 3239717 (U.S. Pat. No. 5,656,711, EP 0765916)

DISCLOSURE OF INVENTION

An object of the invention is to provide an addition-cure fluoropolyether adhesive composition which is fully adherent to metal and plastic substrates when cured.

The inventors have found that a fluoropolyether adhesive composition comprising (A) a linear polyfluoro compound having at least two alkenyl groups per molecule and a perfluoropolyether structure in its main chain, (B) a fluorinated organohydrogensiloxane containing at least two SiH groups per molecule, but not alkoxy and epoxy groups, (C) a platinum group metal-based catalyst, (D) an organosilicon compound having at least one silicon-bonded alkoxy group per molecule, and (E) a hydrolytic catalyst is fully adherent to metal and plastic substrates when cured through addition reaction.

In one aspect, the invention provides an addition-cure fluoropolyether adhesive composition comprising
(A) 100 parts by weight of a linear polyfluoro compound having at least two alkenyl groups per molecule and a perfluoropolyether structure in its main chain,
(B) a fluorinated organohydrogensiloxane containing at least two silicon-bonded hydrogen atoms (i.e., SiH groups) per molecule, but not alkoxy and epoxy groups, in an amount to provide 0.5 to 3.0 moles of SiH groups per mole of alkenyl groups on component (A),
(C) a platinum group metal-based catalyst in an amount to provide 0.1 to 500 ppm of platinum group metal,
(D) 0.01 to 10 parts by weight of an organosilicon compound having at least one silicon-bonded alkoxy group per molecule, and
(E) 0.001 to 5 parts by weight of a hydrolytic catalyst.

The composition may further comprise (F) 0.01 to 10 parts by weight of an organosiloxane containing at least one epoxy group which is bonded to a silicon atom through a carbon atom or through carbon and oxygen atoms per molecule, but not an alkoxy group.

In a preferred embodiment, component (A) is a linear polyfluoro compound of the general formula (1):

$$CH_2=CH—(X)_a—Rf^2—(X')_a—CH=CH_2 \quad (1)$$

wherein X is $—CH_2—$, $—CH_2O—$, $—CH_2OCH_2—$ or $—Y—NR^1—CO—$, wherein Y is $—CH_2—$ or an o-, m- or p-dimethylsilylphenylene group of the structural formula (2):

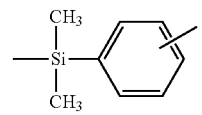

and $R^1$ is hydrogen or a substituted or unsubstituted monovalent hydrocarbon group,
X' is $—CH_2—$, $—OCH_2—$, $—CH_2OCH_2—$ or $—CO—NR^1—Y'—$, wherein Y' is $—CH_2—$ or an o-, m- or p-dimethylsilylphenylene group of the structural for- mula (3):

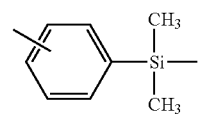

and $R^1$ is as defined above,
"a" is independently 0 or 1, and
$Rf^2$ is a divalent perfluoropolyether group of the general formula (4) or (5):

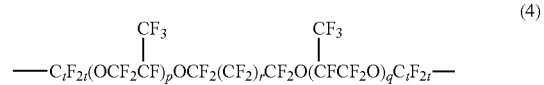

wherein p and q each are an integer from 1 to 150, the sum p+q is from 2 to 200, r is an integer from 0 to 6 and t is 2 or 3,

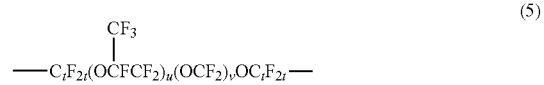

wherein u is an integer from 1 to 200, v is an integer from 1 to 50 and t is as defined above.

Preferably, the linear polyfluoro compound (A) has an alkenyl content of 0.002 to 0.3 mol/100 g.

In another preferred embodiment, the fluorinated organohydrogensiloxane (B) contains at least one monovalent perfluoroalkyl, monovalent perfluorooxyalkyl, divalent perfluoroalkylene or divalent perfluorooxyalkylene group per molecule.

In a further preferred embodiment, the organosilicon compound (D) is an organosiloxane having at least one alkoxysilyl group which is bonded to a silicon atom through a carbon atom or through carbon and oxygen atoms or a trialkoxysilane.

In a further preferred embodiment, the hydrolytic catalyst (E) is an organotitanium compound, organozirconium compound, organotin compound, or organoaluminum compound.

In a further preferred embodiment, the organosiloxane (F) has at least one monovalent perfluoroalkyl or monovalent perfluorooxyalkyl group which is bonded to a silicon atom through a carbon atom or through carbon and oxygen atoms.

ADVANTAGEOUS EFFECTS OF INVENTION

The fluoropolyether adhesive compositions of the invention can be cured through addition reaction into products which are tenaciously adherent to metal and plastic substrates.

DESCRIPTION OF EMBODIMENT

In the specification, the terms "a" and "an" herein do not denote a limitation of quantity, but rather denote the presence of at least one of the referenced item. The abbreviation "Me" stands for methyl, "Ph" stands for phenyl, "pbw" is parts by weight, and "ppm" is parts by weight per million parts by weight.

Briefly stated, the addition-cure fluoropolyether adhesive composition is defined as comprising (A) a linear polyfluoro compound, (B) a fluorinated organohydrogensiloxane, (C) a platinum group metal-based catalyst, (D) an organosilicon compound, and (E) a hydrolytic catalyst as essential components. These components are described in detail.

Component A

Component (A) is a linear polyfluoro compound having at least two alkenyl groups per molecule and a perfluoropolyether structure in its main chain, which preferably has the general formula (1).

$$CH_2=CH-(X)_a-Rf^2-(X')_a-CH=CH_2 \quad (1)$$

Herein, X is —CH$_2$—, —CH$_2$O—, —CH$_2$OCH$_2$— or —Y—NR$^1$—CO—, wherein Y is —CH$_2$— or an o-, m- or p-dimethylsilylphenylene group of the structural formula (2):

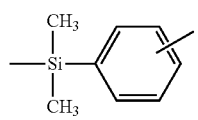

(2)

and R$^1$ is hydrogen or a substituted or unsubstituted monovalent hydrocarbon group. X' is —CH$_2$—, —OCH$_2$—, —CH$_2$OCH$_2$— or —CO—NR$^1$—Y'—, wherein Y' is —CH$_2$— or an o-, m- or p-dimethylsilylphenylene group of the structural formula (3):

(3)

and R$^1$ is as defined above. Rf$^2$ is a divalent perfluoropolyether group. The subscript "a" is each independently 0 or 1.

R$^1$ is a hydrogen atom or a monovalent hydrocarbon group, preferably of 1 to 12 carbon atoms, and more preferably 1 to 10 carbon atoms. Exemplary hydrocarbon groups include alkyl groups such as methyl, ethyl, propyl, butyl, hexyl, cyclohexyl and octyl; aryl groups such as phenyl and tolyl; aralkyl groups such as benzyl and phenylethyl; and substituted forms of the foregoing monovalent hydrocarbon groups in which some or all hydrogen atoms are substituted by halogen atoms such as fluorine.

In formula (1), Rf$^2$ is a divalent perfluoropolyether structure, preferably a group having the general formula (4) or (5).

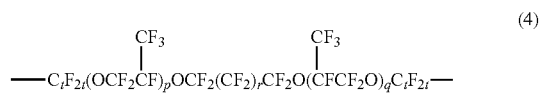

(4)

Herein p and q each are an integer from 1 to 150, the sum p+q is from 2 to 200, r is an integer from 0 to 6, and t is 2 or 3.

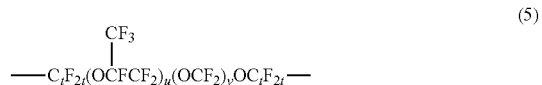

(5)

Herein u is an integer from 1 to 200, v is an integer from 1 to 50, and t is as defined above.

Preferred examples of the Rf$^2$ group include those of the following formulas (i) to (iii), with the divalent groups of formula (i) being more preferred.

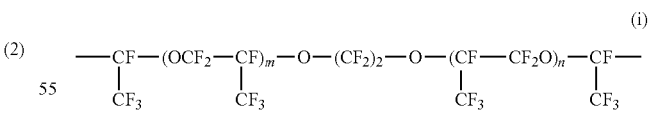

(i)

Herein m and n each are an integer of at least 1, and m+n is from 2 to 200.

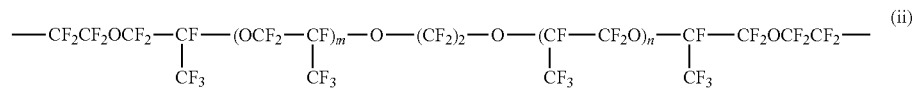

(ii)

Herein m and n each are an integer of at least 1, and m+n is from 2 to 200.

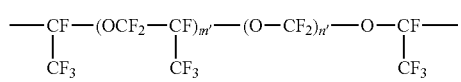

Herein m' is an integer from 1 to 200, and n' is an integer from 1 to 50.

Preferred as component (A) are compounds of the general formula (7).

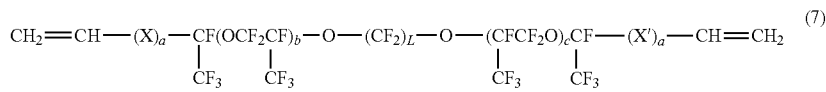

Herein, X is —CH$_2$—, —CH$_2$O—, —CH$_2$OCH$_2$— or —Y—NR$^1$—CO—, wherein Y is —CH$_2$— or an o-, m- or p-dimethylsilylphenylene group of the structural formula (2):

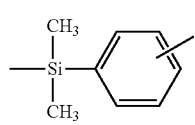

and R$^1$ is hydrogen, methyl, phenyl or allyl; X' is —CH$_2$—, —OCH$_2$—, —CH$_2$OCH$_2$— or —CO—NR$^1$—Y'—, wherein Y' is —CH$_2$— or an o-, m- or p-dimethylsilylphenylene group of the structural formula (3):

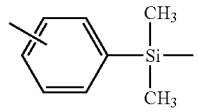

and R$^1$ is as defined above; the subscript "a" is each independently 0 or 1, L is an integer from 2 to 6, and "b" and "c" each are an integer from 0 to 200.

Examples of the linear polyfluoro compounds of formula (7) include those compounds having the following formulas.

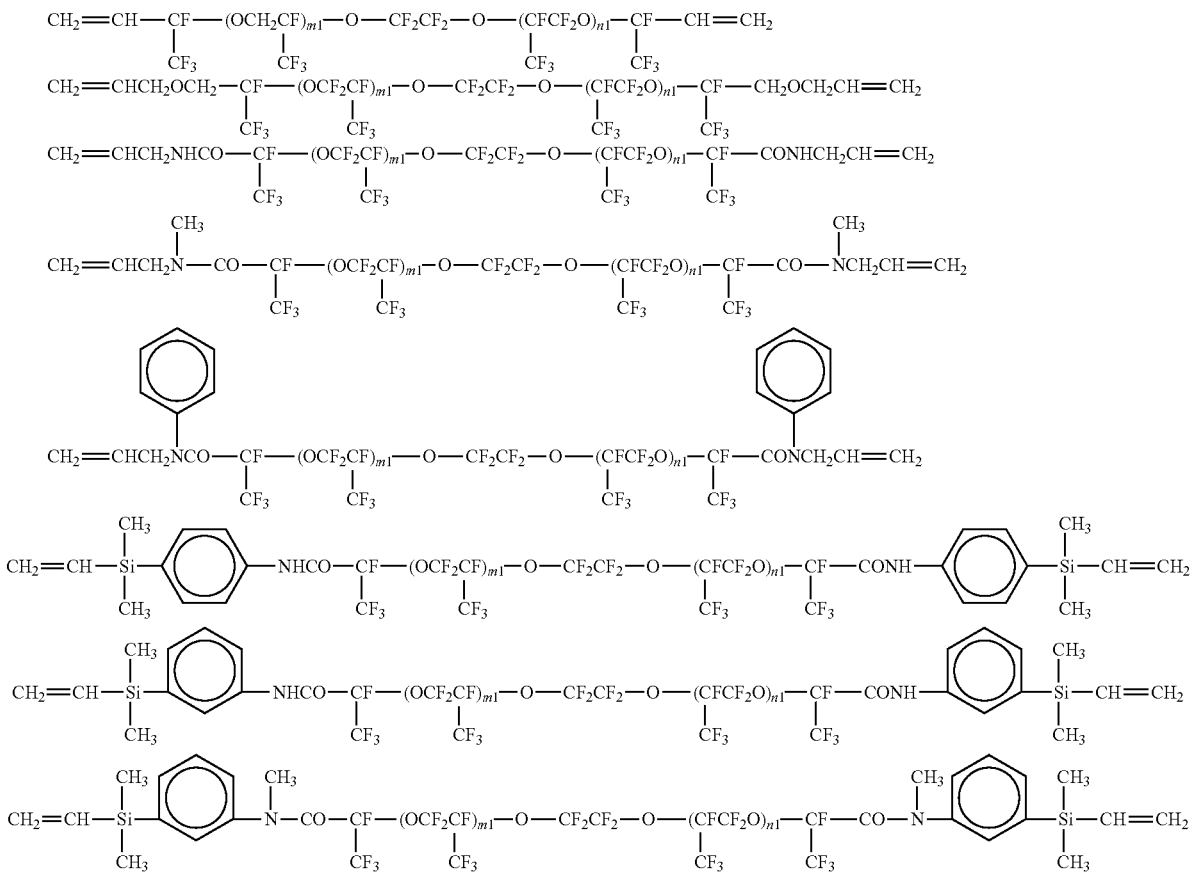

In the above formulas, m1 and n1 each are an integer from 0 to 200, and m1+n1 is from 6 to 200.

Preferably the linear polyfluoro compound has an alkenyl content of 0.002 to 0.3 mol/100 g. An alkenyl content of less than 0.002 mol/100 g may lead to a short degree of crosslinking and undercure whereas an alkenyl content in excess of 0.3 mol/100 g may detract from the mechanical properties of the cured fluoropolyether composition which are desired as rubber elastomer.

Also preferably the linear polyfluoro compound has a viscosity at 23° C. in a range of 5 to 100,000 mPa-s, more preferably 500 to 50,000 mPa-s, and even more preferably 1,000 to 20,000 mPa-s, as measured according to JIS K-6249 because the composition comprising the same can have appropriate physical properties when used for such purposes as sealing, potting, coating and impregnation, and also in the cured form. An optimum viscosity for the intended application can be selected from within this viscosity range.

These linear polyfluoro compounds may be used alone or in a combination of two or more thereof.

Component B

Component (B) is a fluorinated organohydrogensiloxane containing at least two silicon-bonded hydrogen atoms per molecule, but not alkoxy and epoxy groups. The silicon-bonded hydrogen atom is sometimes referred to as hydrosilyl or SiH group. In the composition, component (B) functions as a crosslinking agent or chain extender for component (A). For compatibility with and dispersibility in component (A), and uniformity after curing, it is preferable for component (B) to have on the molecule at least one fluorinated group selected from among monovalent perfluoroalkyl groups, monovalent perfluorooxyalkyl groups, divalent perfluoroalkylene groups and divalent perfluorooxyalkylene groups.

Suitable fluorinated groups include those of the following general formulas:

$C_gF_{2g+1}$—,

—$C_gF_{2g}$—, wherein g is an integer from 1 to 20, and preferably from 2 to 10,

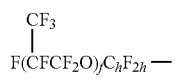
$F(CFCF_2O)_fC_hF_{2h}$—
      |
      $CF_3$ wherein f is an integer from 2 to 200, and preferably from 2 to 100, and h is an integer from 1 to 3,

$$—CF(OCF_2CF)_iOCF_2CF_2O(CFCF_2O)_jCF—$$
with $CF_3$ substituents wherein i and j each are an integer of at least 1, i+j is from 2 to 200, and preferably from 2 to 100, and

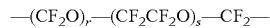
—$(CF_2O)_r$—$(CF_2CF_2O)_s$—$CF_2$— wherein r and s each are an integer from 1 to 50.

Divalent linkages for linking the above perfluoroalkyl, perfluorooxyalkyl, perfluoroalkylene or perfluorooxyalkylene groups with silicon atoms include alkylene groups, arylene groups and combinations thereof, which may be separated by an ether-bonding oxygen atom, amide bond, carbonyl bond or the like. Specific examples include those having 2 to 12 carbons, such as —$C_2CH_2$—, —$CH_2CH_2CH_2$—, —$CH_2CH_2CH_2OCH_2$—, —$CH_2CH_2CH_2$—NH—CO—, —$CH_2CH_2CH_2$—N(Ph)-CO—, —$C_2CH_2CH_2$—N($CH_3$)—CO—, and —$CH_2CH_2CH_2$—O—CO—.

In addition to the monovalent or divalent fluorinated substituent group, i.e., organic group having a perfluoroalkyl, perfluorooxyalkyl, perfluoroalkylene or perfluorooxyalkylene group, the fluorinated organohydrogenpolysiloxane (B) may contain another monovalent substituent group bonded to a silicon atom. Suitable other substituent groups are substituted or unsubstituted hydrocarbon groups of 1 to 20 carbon atoms including alkyl groups such as methyl, ethyl, propyl, butyl, hexyl, cyclohexyl, octyl, and decyl, alkenyl groups such as vinyl and allyl, aryl groups such as phenyl, tolyl and naphthyl, aralkyl groups such as benzyl and phenylethyl, and substituted forms of the foregoing in which at least some hydrogen atoms are substituted by chlorine atoms, cyano groups or the like, such as chloromethyl, chloropropyl, and cyanoethyl.

The fluorinated organohydrogenpolysiloxane (B) may be cyclic, chain-like, three-dimensional network or combinations thereof. Although the number of silicon atoms in the fluorinated organohydrogenpolysiloxane is not particularly limited, it is generally from 2 to about 60, preferably from 3 to about 30.

Illustrative examples of component (B) having such fluorinated groups include the following compounds. These compounds may be used singly or as combinations of two or more thereof.

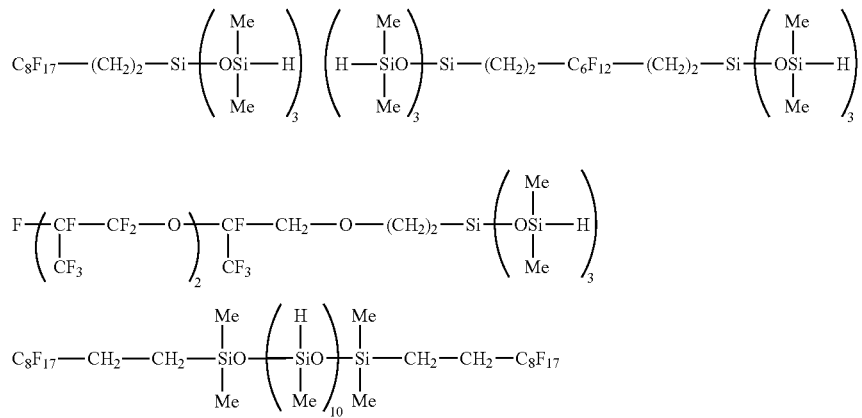

-continued

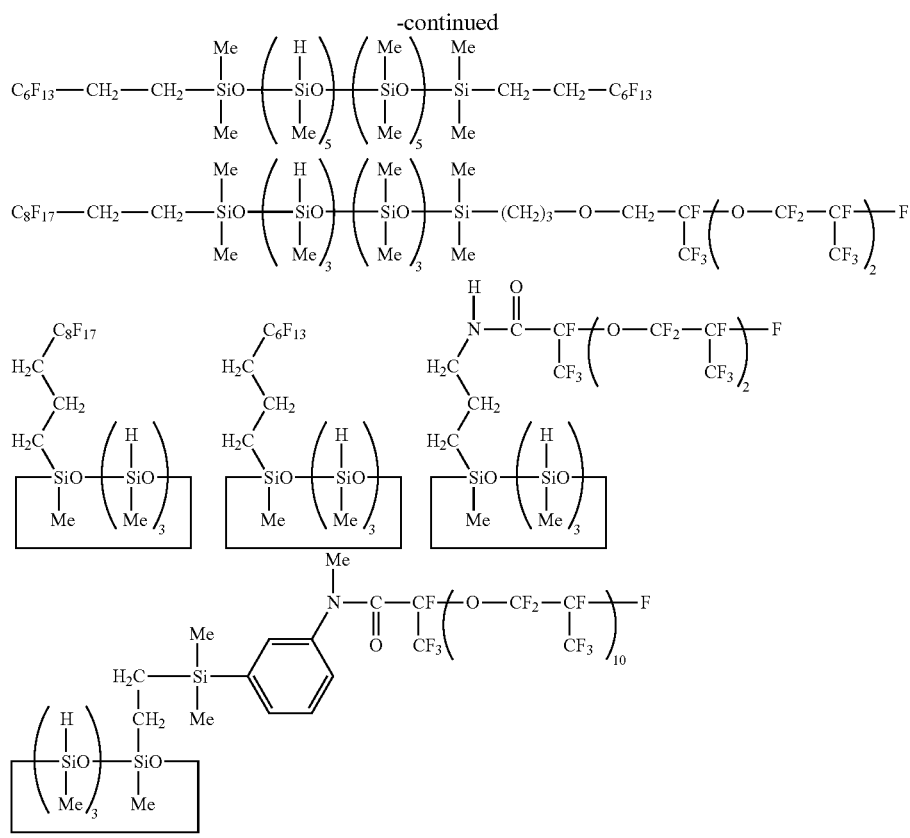

Component (B) is included in an amount effective for curing component (A), and specifically a sufficient amount to provide 0.5 to 3.0 moles, and preferably 0.8 to 2.0 moles of hydrosilyl (SiH) groups per mole of alkenyl groups (e.g., vinyl, allyl, cycloalkenyl groups) on component (A). Too few hydrosilyl groups may lead to an insufficient degree of crosslinking, failing to obtain a properly cured product. Too many hydrosilyl groups may result in foaming during the curing process.

Component C

Component (C) is a platinum group metal based catalyst which is a hydrosilylation reaction catalyst. The hydrosilylation catalyst promotes addition reactions between alkenyl groups in component (A) and hydrosilyl groups in component (B). The hydrosilylation catalysts are generally noble metals or compounds thereof, and thus expensive. Of these, platinum or platinum compounds are often used because they are readily available.

Exemplary platinum compounds include chloroplatinic acid and complexes of chloroplatinic acid with olefins (e.g., ethylene), alcohols and vinyl siloxanes, and metallic platinum on supports such as silica, alumina and carbon. Known platinum group metal catalysts other than platinum compounds include rhodium, ruthenium, iridium and palladium compounds, for example, $RhCl(PPh_3)_3$, $RhCl(CO)(PPh_3)_2$, $Ru_3(CO)_{12}$, $IrCl(CO)(PPh_3)_2$ and $Pd(PPh_3)_4$.

If these catalysts are solid catalysts, they may be used in a solid state. A more uniform cured product may be obtained by previously dissolving chloroplatinic acid or a complex thereof in a suitable solvent so that the resulting solution is compatible with the linear polyfluoro compound (A).

Component (C) may be used in a catalytic amount. The amount of catalyst used may be determined as appropriate depending on the desired cure rate. Typically, the catalyst is used in an amount to provide 0.1 to 500 ppm of platinum group metal based on the weight of component (A).

Component D

Component (D) is an organosilicon compound containing at least one silicon-bonded alkoxy group per molecule. It is a tackifier for conferring the composition with sufficient self-adhesiveness. It is preferably an organosiloxane having at least one alkoxysilyl group which is bonded to a silicon atom through a carbon atom or through carbon and oxygen atoms or a trialkoxysilane. These organosilicon compounds may be used alone or in admixture of two or more as component (D).

For compatibility with and dispersibility in component (A), and uniformity after curing, the organosilicon compound (D) may have also at least one monovalent perfluoroalkyl group or monovalent perfluorooxyalkyl group. For addition reaction with component (A), the organosilicon compound (D) may have at least one silicon-bonded hydrogen atom per molecule.

The organosiloxane (D) has a siloxane skeleton which may be cyclic, linear or branched, or a combination thereof. Suitable organosiloxanes used herein include those having the following general formulas.

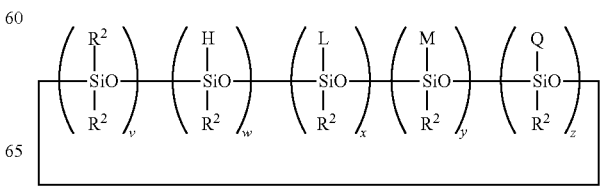

-continued

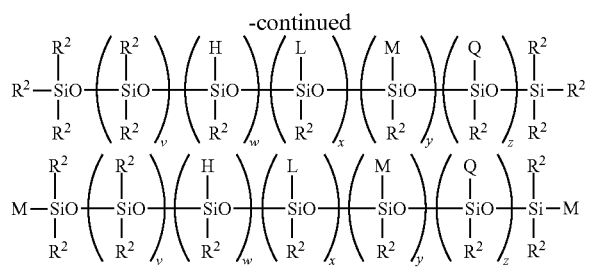

In these formulas, $R^2$ is a halogen-substituted or unsubstituted monovalent hydrocarbon group; L, M and Q are as described below; the subscript v is an integer from 0 to 50, and preferably from 0 to 20; w is an integer from 0 to 50, and preferably from 0 to 20; x is an integer from 1 to 50, and preferably from 1 to 20; y is an integer from 0 to 50, and preferably from 0 to 20; and z is an integer from 0 to 50, and preferably from 0 to 20. The sum v+w+x+y+z is such an integer that the organosiloxane may have a weight average molecular weight of 500 to 20,000, as measured by GPC versus polystyrene standards.

$R^2$ is a halogen-substituted or unsubstituted monovalent hydrocarbon group of 1 to 10 carbon atoms, and preferably 1 to 8 carbon atoms. Examples include alkyl groups such as methyl, ethyl, propyl, butyl, hexyl, cyclohexyl and octyl; aryl groups such as phenyl and tolyl; aralkyl groups such as benzyl and phenylethyl; and substituted forms of the foregoing monovalent hydrocarbon groups in which some or all hydrogen atoms are substituted by fluorine or other halogen atoms. Of these, methyl is most preferred.

In the above formulas, L represents an alkoxysilyl group which is bonded to a silicon atom through an intervening carbon atom or through intervening carbon and oxygen atoms. Specific examples include groups of the following formulas.

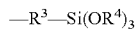

Herein $R^3$ is a divalent hydrocarbon group with 1 to 10 carbon atoms, and preferably 1 to 4 carbon atoms, typically an alkylene group such as methylene, ethylene, propylene, butylene, hexylene, cyclohexylene or octylene. $R^4$ is a monovalent hydrocarbon group with 1 to 8 carbon atoms, and preferably 1 to 4 carbon atoms, typically an alkyl group such as methyl, ethyl or n-propyl.

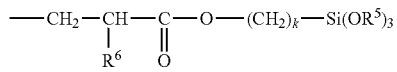

Herein $R^5$ is a monovalent hydrocarbon group with 1 to 8 carbon atoms, and preferably 1 to 4 carbon atoms, typically an alkyl group such as methyl, ethyl or n-propyl. $R^6$ is hydrogen or methyl, and k is an integer from 2 to 10.

In the above formulas, M represents a group of the general formula (8).

 (8)

Herein Z is —$(CH_2)_h$— or —$(CH_2)_i$—X"— wherein X" is a group of the formula: —$OCH_2$— or —Y"—NR'—CO— wherein Y" is —$CH_2$— or an o-, m- or p-dimethylsilylphenylene group of the structural formula (9):

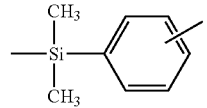 (9)

and R' is hydrogen or a substituted or unsubstituted monovalent hydrocarbon group of 1 to 12 carbon atoms, and more preferably 1 to 10 carbon atoms, h and i each are an integer from 1 to 10, and preferably from 1 to 5, and Rf is a monovalent perfluoroalkyl or perfluorooxyalkyl group.

Examples of the monovalent perfluoroalkyl or perfluorooxyalkyl group represented by Rf are as exemplified for the monovalent fluorinated groups in component (B). Exemplary groups include those of the following general formulas.

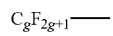

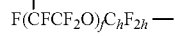

Herein g is an integer from 1 to 20, and preferably from 2 to 10, f is an integer from 2 to 200, and preferably from 2 to 100, and h is an integer from 1 to 3.

In the above formulas, Q represents an epoxy group which is bonded to a silicon atom through an intervening carbon atom or through intervening carbon and oxygen atoms. Exemplary epoxy groups are shown below.

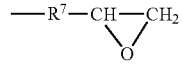

Herein $R^7$ is a divalent hydrocarbon group of 1 to 10 carbon atoms, preferably 1 to 5 carbon atoms, which may be separated by an oxygen atom, for example, an alkylene group such as methylene, ethylene, propylene, butylene, hexylene, cyclohexylene or octylene.

Examples of the organosiloxane which can be used as component (D) include those having the following structural formulas.

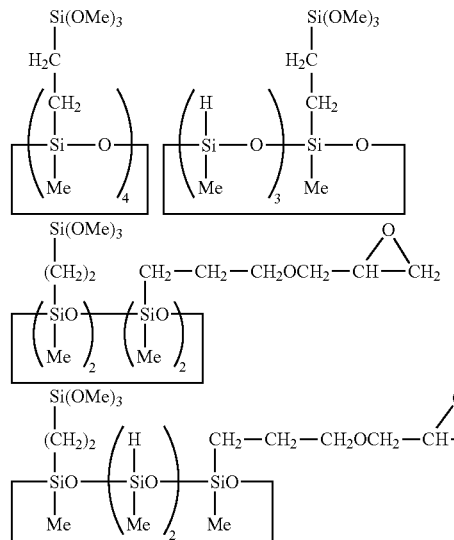

-continued

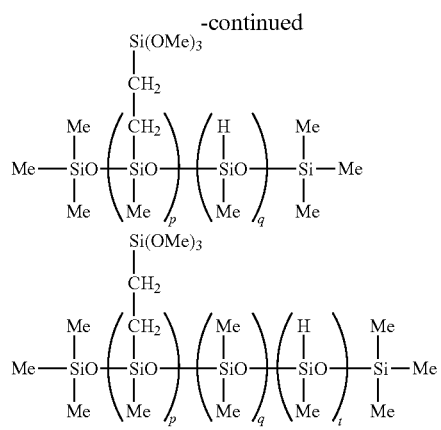

The letters p, q and r each are an integer inclusive of 0.

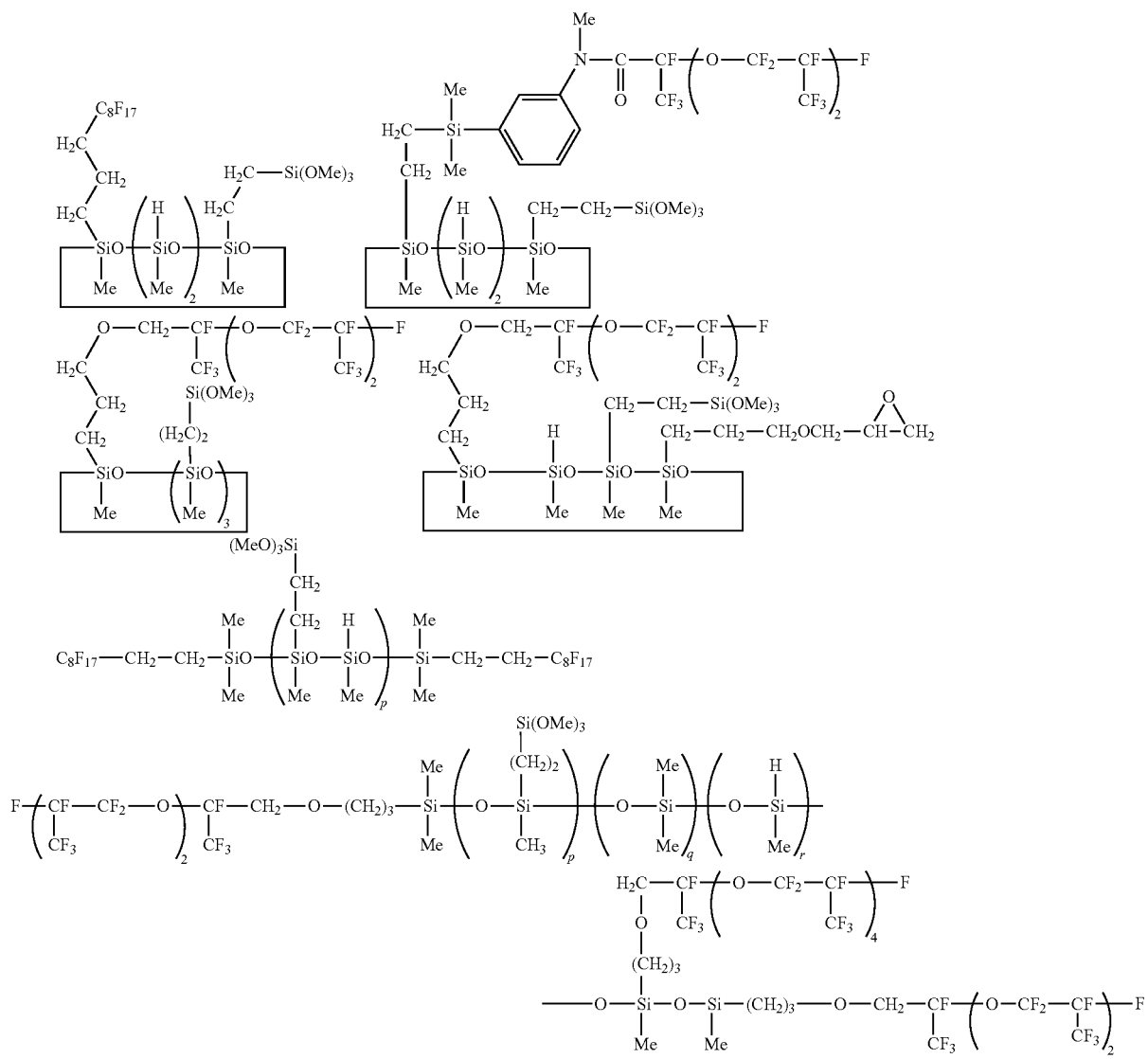

The letters p, q and r each are an integer inclusive of 0.

Preferred examples of the trialkoxysilane which can be used as component (D) include, but are not limited to, silanes containing alkoxy groups and a reactive organic group within a common molecule such as vinyltrimethoxysilane, 3-glycidoxypropyltrimethoxysilane, 3-glycidoxypropyltriethoxysilane, 3-aminopropyltrimethoxysilane, 3-(methacryloxypropyl)trimethoxysilane, 2-(3,4-epoxycyclohexyl)ethyltrimethoxysilane, N-2-(aminoethyl)-3-aminopropyltrimethoxysilane, N-phenyl-3-aminopropyltrimethoxysilane, 3-mercaptopropyltrimethoxysilane, and 3-isocyanatopropyltrimethoxysilane; and fluorinated trialkoxysilanes such as perfluoropropyltrimethoxysilane.

Component (D) is included in an amount of 0.01 to 10 parts by weight, and preferably 0.05 to 5 parts by weight, per 100 parts by weight of component (A). Less than 0.01 pbw of component (D) cannot achieve sufficient adhesion. Inclusion of more than 10 pbw of component (D) may interfere with the flow and cure of the composition and adversely affect the physical strength of the cured composition.

Component E

Component (E) is a hydrolytic catalyst for facilitating the hydrolysis of the organosilicon compound (D). Exemplary catalysts include organotitanium compounds such as titanium tetraisopropoxide, titanium tetra-n-butoxide, and titanium tetraacetylacetonate; organozirconium compounds such as zirconium tetra-n-propoxide, zirconium tetra-n-butoxide, and zirconium tetraacetylacetonate; organotin compounds such as dibutyltin dilaurate, dibutyltin diacetate, and dibutyltin acetylacetonate; organoaluminum compounds such as aluminum trisacetylacetonate, aluminum trimethylacetoacetate, and diisopropoxyaluminum ethylacetoacetate; other acidic catalysts and basic catalysts. Although any hydrolytic catalysts which do not interfere with the addition cure of the composition may be used, preference is given to organotitanium compounds, organozirconium compounds, organotin compounds, and organoaluminum compounds because of the shelf stability of the fluoropolyether adhesive composition. These hydrolytic catalysts may be used alone or in admixture of two or more.

Component (E) is included in an amount of 0.001 to 5 parts by weight, and preferably 0.01 to 1 part by weight per 100 parts by weight of component (A). Less than 0.001 pbw of component (E) fails in catalysis whereas more than 5 pbw of component (E) may cause component (D) to cure in gel form or adversely affect the flow of the composition.

Component F

In the addition-cure fluoropolyether adhesive composition, various additives may be added to enhance its viable utility if necessary. Among others, it is preferred to add (F) an organosilicon compound containing at least one epoxy group which is bonded to a silicon atom through an intervening carbon atom or through intervening carbon and oxygen atoms per molecule, but not an alkoxy group, as a tackifier.

For compatibility with and dispersibility in component (A), and uniformity after curing, preferably the organosilicon compound (F) may have at least one monovalent perfluoroalkyl group or monovalent perfluorooxyalkyl group which is bonded to a silicon atom through an intervening carbon atom or through intervening carbon and oxygen atoms. For addition reaction with component (A), the organosilicon compound (F) may have at least one silicon-bonded hydrogen atom per molecule.

Like the organosiloxane (D), the siloxane skeleton of the organosilicon compound (F) may be cyclic, linear or branched, or a combination thereof.

The organosiloxanes which can be used as component (F) include those of the following general formulas.

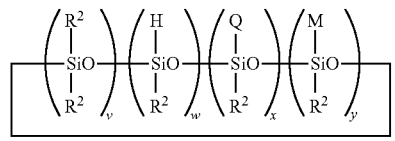

-continued

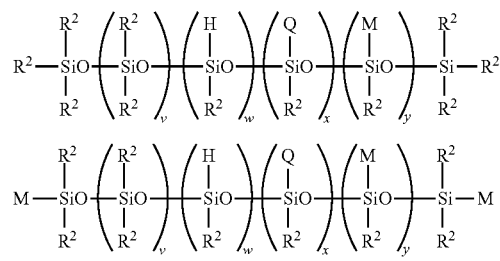

Herein $R^2$, $R^4$, M, Q, v, w, x and y are as defined above for the organosiloxane (D).

Examples of the organosiloxane which can be used as component (F) include those compounds of the following structural formulas. These compounds may be used alone or in admixture of two or more.

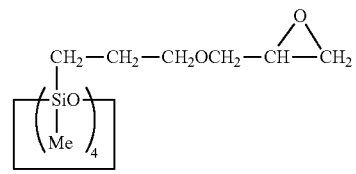

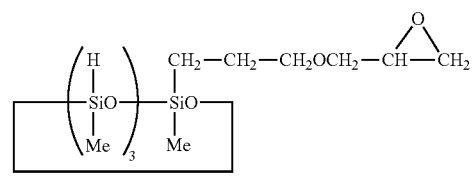

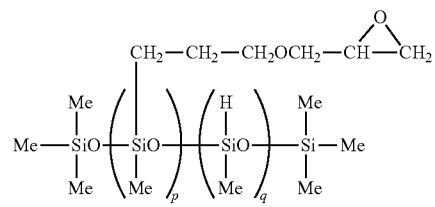

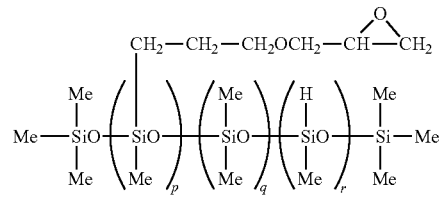

The letters p, q and r each are an integer inclusive of 0.

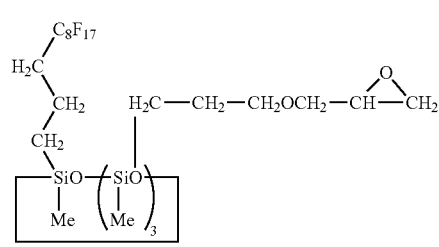

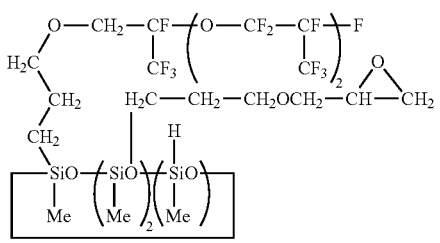

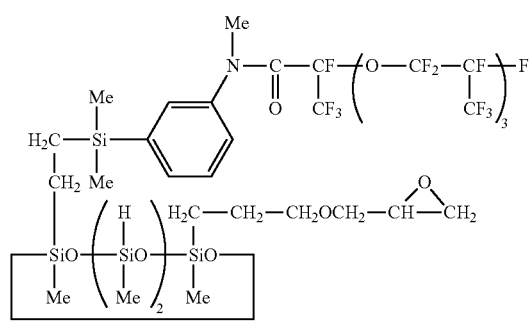
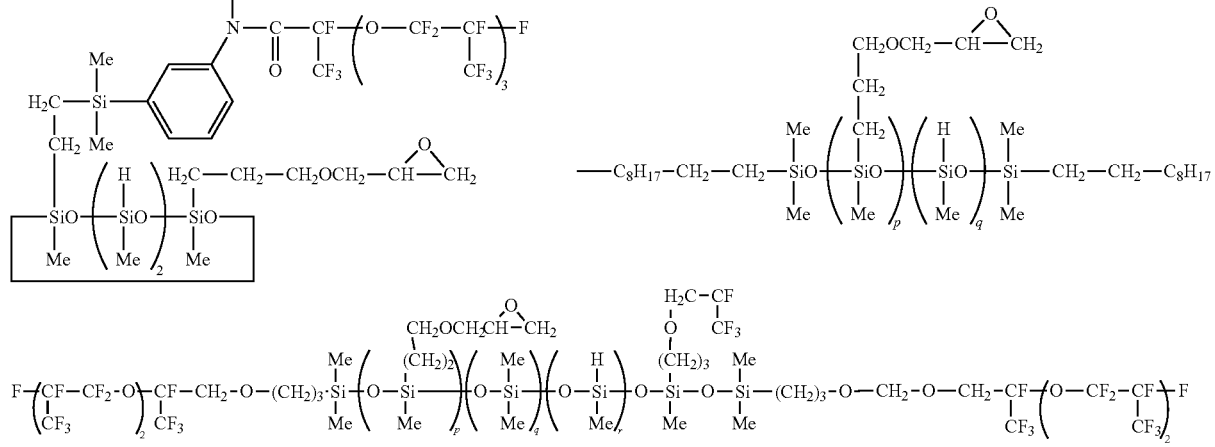

20

The letters p, q and r each are an integer inclusive of 0.

Component (F) is included in an amount of 0.01 to 10 parts by weight, and preferably 0.1 to 5 parts by weight, per 100 parts by weight of component (A). Less than 0.01 pbw of component (F) may not achieve sufficient adhesion. Inclusion of more than 10 pbw of component (F) may interfere with the flow of the composition and adversely affect the physical strength of the cured composition.

Other Components

In addition to above components (A) to (E) and optional component (F), optional ingredients may be included in the inventive composition to increase its viable utility, for example, plasticizers, viscosity modifiers, flexibilizers, inorganic fillers, and adhesion promoters. These additives may be included in any desired amounts insofar as they do not compromise the objects of the invention or adversely affect the properties of the composition in both the uncured and cured states.

Polyfluoromonoalkenyl compounds of the general formula (10) below and/or linear polyfluoro compounds of the general formulas (11) and (12) below may be used as the plasticizer, viscosity modifier or flexibilizer.

$$Rf^3-(X')_aCH=CH_2 \quad (10)$$

In formula (10), X' and "a" are as defined in formula (1), and $Rf^3$ is a group having the general formula (13):

(13)

wherein t is 2 or 3, and w is a positive integer which is at least 1, but smaller than the sum p+q+r and smaller than the sum u+v for the $Rf^2$ group in above component (A).

$$D-O-(CF_2CF_2CF_2O)_c-D \quad (11)$$

In formula (11), D is a group of the formula $C_sF_{2s+1}$—, s being 1 to 3, and c is an integer which is from 1 to 200, but smaller than the sum p+q+r and smaller than the sum u+v for the $Rf^2$ group in above component (A).

$$D-O-(CF_2O)_d(CF_2CF_2O)_e-D \quad (12)$$

In formula (12), D is as defined above, and d and e each are an integer of 1 to 200 such that the sum d+e is no larger than the sum p+q+r and no larger than the sum u+v for the $Rf^2$ group in above component (A).

Examples of polyfluoromonoalkenyl compounds of formula (10) include the following, wherein m2 satisfies the above requirement.

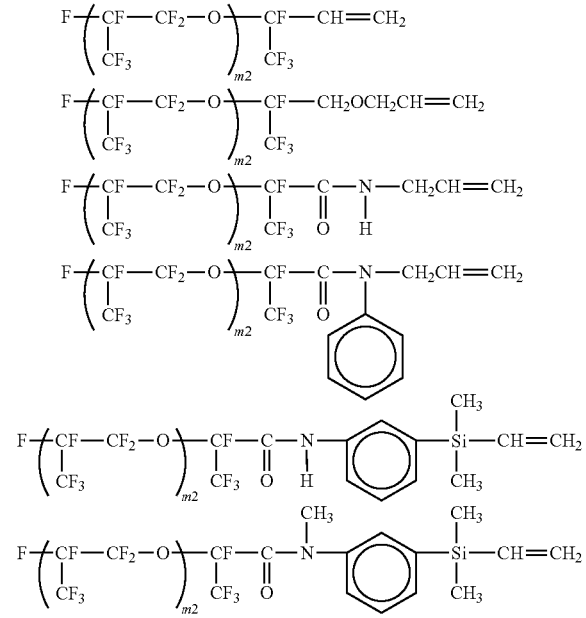

Examples of linear polyfluoro compounds of formulas (11) and (12) include the following, wherein n3 and the sum n3+m3 satisfy the above requirements.

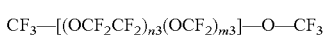

In these formulas, m3 and n3 each are from 1 to 200, and the sum m3+n3 is from 2 to 201.

Polyfluoro compounds of formulas (10) to (12) may be included in the composition in an amount of 1 to 200 parts by weight, and preferably 1 to 150 parts by weight, per 100 parts by weight of component (A). Like component (A), the polyfluoro compounds of formulas (10) to (12) desirably have a viscosity at 23° C. within a range of 5 to 100,000 mPa·s.

Exemplary inorganic fillers include reinforcing or semi-reinforcing fillers such as fumed silica, colloidal silica, quartz powder, fused silica powder, diatomaceous earth and calcium carbonate (typically in amounts of 0.1 to 50 pbw, and preferably 1 to 25 pbw per 100 pbw of component (A)); inorganic pigments such as titanium oxide, iron oxide, carbon black and cobalt aluminate; heat stabilizers such as titanium oxide, iron oxide, carbon black, cerium oxide, cerium hydroxide, zinc carbonate, magnesium carbonate and manganese carbonate; and thermal conductive agents such as alumina, boron nitride, silicon carbide and metal powders.

Suitable hydrosilylation catalyst regulators include acetylenic alcohols such as 1-ethynyl-1-hydroxycyclohexane, 3-methyl-1-butyn-3-ol, 3,5-dimethyl-1-hexyn-3-ol, 3-methyl-1-penten-3-ol and phenylbutynol; the reaction products of chlorosilanes having a monovalent fluorinated substituent with the foregoing acetylenic alcohols; 3-methyl-3-penten-1-yne, 3,5-dimethyl-3-hexen-1-yne and triallyl isocyanurate; polyvinylsiloxane, and organophosphorus compounds. The addition of these compounds helps to maintain a curing reactivity and shelf stability appropriate.

Adhesion promoters such as carboxylic anhydrides and tetraallyl pyromellitate may also be added to the composition.

No particular limitation is imposed on the construction of the adhesive composition. Depending on a particular application, the composition may be of one package type, that is, formulated as a single composition containing components (A) to (E), (F) and optional other ingredients altogether. Alternatively, the composition may be formulated as two packages which are mixed at the time of use.

The addition-cure fluoropolyether adhesive composition may be cured under any conditions as long as the temperature is in a range of from 20° C. to less than 200° C., preferably from 50° C. to less than 180° C. A suitable curing time may be selected such that the crosslinking reaction and substrate binding reaction are complete although the curing time is preferably from 5 minutes to 24 hours, more preferably 10 minutes to 12 hours.

The addition-cure fluoropolyether adhesive composition is cured into a product which is tenaciously adherent to metal and plastic substrates. Then the composition is best suited as the adhesive to be applied around electric and electronic components and around automobile components.

On use of the adhesive composition, the composition may be dissolved in a suitable fluorochemical solvent to an appropriate concentration, depending on a particular application and purpose of use. Suitable solvents include 1,3-bis(trifluoromethyl)benzene, Fluorinert® (available from 3M Corporation), perfluorobutyl methyl ether and perfluorobutyl ethyl ether. The use of a solvent is especially preferred in thin-film coating applications.

When cured products of the fluoropolyether adhesive compositions are bonded to various substrates, various primers may be used in combination.

EXAMPLES

Examples of the invention are given below by way of illustration and not by way of limitation. All parts are by weight. The viscosity is measured at 23° C. in accordance with JIS K-6249.

Example 1

The ingredients used herein were:
100 parts of a polymer of formula (14) (viscosity 10,000 mPa·s, vinyl content 0.0119 mol/100 g),
4.0 parts of fumed silica R-976 which had been surface treated to be hydrophobic (Nippon Aerosil Co., Ltd., BET specific surface area 250 m²/g),
1.24 parts of a fluorinated organohydrogensiloxane of formula (15) (SiH content 0.00668 mol/g),
1.81 parts of a fluorinated organohydrogensiloxane of formula (16) (SiH content 0.00394 mol/g),
0.20 part of a toluene solution of platinum-divinyltetramethyldisiloxane complex (platinum concentration 0.5 wt %),
1.5 parts of an organosilicon compound of formula (17),
0.20 part of an organosilicon compound of formula (18), and
0.07 part of a hydrolytic catalyst of formula (19).
A composition was prepared by adding the ingredients in sequence to the polymer and mixing them until uniform, followed by deaeration.

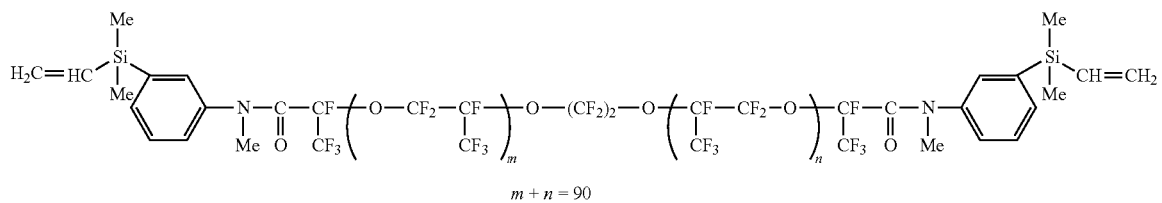

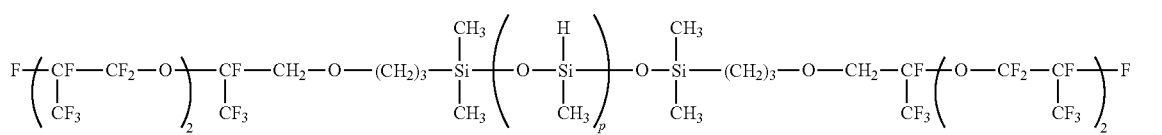

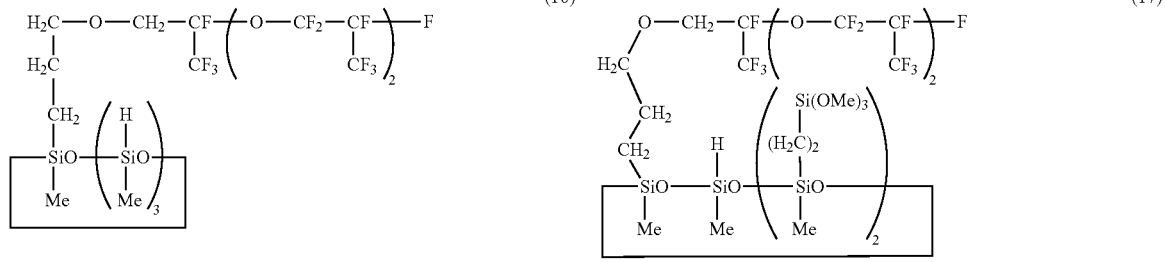

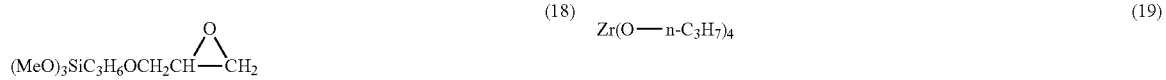

Next, adhesion test specimens were prepared by sandwiching a 1 mm thick layer of the composition of Example 1 between 100×25 mm test panels of different adherends (aluminum, polybutylene terephthalate (PBT) resin, and polyphenylene sulfide (PPS) resin) arranged with an overlap between their respective edges of 10 mm, and heating at 150° C. for 1 hour to cure the composition. A tensile-shear strength test (pulling rate 50 mm/min) was carried out on these specimens for evaluating shear bond strength (MPa) and cohesive failure rate (area %). The results are shown in Table 1.

Example 2

A composition was prepared by the same procedure as in Example 1 aside from blending 0.07 part of a hydrolytic catalyst of formula (20) instead of the hydrolytic catalyst of formula (19). Shear strength and cohesive failure were similarly tested, with the results shown in Table 1.

$$Zr(O-n-C_4H_9)(C_5H_7O_2)(C_6H_9O_3)_2 \tag{20}$$

Example 3

A composition was prepared by the same procedure as in Example 1 aside from blending 0.07 part of a hydrolytic catalyst of formula (21) instead of the hydrolytic catalyst of formula (19). Shear strength and cohesive failure were similarly tested, with the results shown in Table 1.

$$Ti(O-i-C_3H_7)_4 \tag{21}$$

Example 4

A composition was prepared by the same procedure as in Example 1 aside from blending 0.07 part of a hydrolytic catalyst of formula (22) instead of the hydrolytic catalyst of formula (19). Shear strength and cohesive failure were similarly tested, with the results shown in Table 1.

$$(n-C_4H_9)_2Sn(OCH_3)_2 \tag{22}$$

Example 5

A composition was prepared by the same procedure as in Example 1 aside from blending 0.07 part of a hydrolytic catalyst of formula (23) instead of the hydrolytic catalyst of formula (19). Shear strength and cohesive failure were similarly tested, with the results shown in Table 1.

$$Al(O-i-C_3H_7)_3 \tag{23}$$

Example 6

A composition was prepared by the same procedure as in Example 1 aside from blending 0.5 part of an organosilicon compound of formula (24) instead of the organosilicon compound of formula (18). Shear strength and cohesive failure were similarly tested, with the results shown in Table 1.

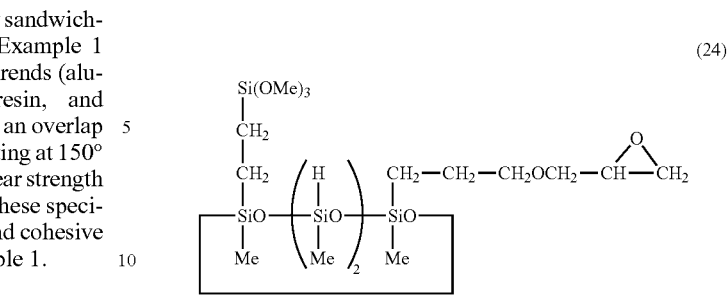
(24)

Example 7

A composition was prepared by the same procedure as in Example 1 aside from further adding 1.5 parts of an organosiloxane of formula (25). Shear strength and cohesive failure were similarly tested, with the results shown in Table 1.

(25)

Comparative Example 1

A composition was prepared by the same procedure as in Example 1 aside from omitting the hydrolytic catalyst of formula (19). Shear strength and cohesive failure were similarly tested, with the results shown in Table 2.

Comparative Example 2

A composition was prepared by the same procedure as in Example 1 aside from blending 1.5 parts of an organosilicon compound of formula (25) instead of the organosilicon compounds of formulas (17) and (18). Shear strength and cohesive failure were similarly tested, with the results shown in Table 2.

Comparative Example 3

A composition similar to Example 7 was prepared by the same procedure as in Example 1 aside from omitting the hydrolytic catalyst of formula (19). Shear strength and cohesive failure were similarly tested, with the results shown in Table 2.

TABLE 1

| Shear bond strength, MPa | | Example | | | | | | |
|---|---|---|---|---|---|---|---|---|
| | | 1 | 2 | 3 | 4 | 5 | 6 | 7 |
| Adherend | Al | 1.2 (100) | 1.1 (90) | 1.1 (100) | 0.9 (90) | 1.1 (100) | 1.1 (100) | 1.2 (100) |
| | PBT | 0.6 (100) | 0.5 (100) | 0.5 (100) | 0.5 (100) | 0.5 (100) | 0.6 (100) | 0.7 (100) |
| | PPS | 0.6 (60) | 0.6 (60) | 0.6 (50) | 0.6 (50) | 0.6 (50) | 0.6 (60) | 1.0 (100) |

Values in parenthesis indicate cohesive failure rate in % by area.

TABLE 2

| Shear bond strength, MPa | | Comparative Example | | |
|---|---|---|---|---|
| | | 1 | 2 | 3 |
| Adherend | Al | 0.5 (40) | 0.4 (40) | 0.6 (50) |
| | PBT | 0.4 (70) | 0.5 (80) | 0.5 (90) |
| | PPS | 0.2 (0) | 0.6 (50) | 0.6 (50) |

Values in parenthesis indicate cohesive failure rate in % by area.

Japanese Patent Application No. 2010-009201 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An addition-cure fluoropolyether adhesive composition, comprising:
(A) 100 parts by weight of a linear polyfluoro compound having at least two alkenyl groups per molecule and a perfluoropolyether structure in its main chain;
(B) a fluorinated organohydrogensiloxane containing at least two silicon-bonded hydrogen atoms (SiH groups) per molecule, but not alkoxy and epoxy groups, in an amount to provide 0.5 to 3.0 moles of SiH groups per mole of alkenyl groups on component (A);
(C) a platinum group metal-based catalyst in an amount to provide 0.1 to 500 ppm of platinum group metal;
(D) 0.01 to 10 parts by weight of an organosilicon compound having at least one silicon-bonded alkoxy group per molecule;
(E) 0.001 to 5 parts by weight of a hydrolytic catalyst; and
(F) 0.01 to 10 parts by weight of an organosiloxane containing at least one epoxy group which is bonded to a silicon atom through a carbon atom or through carbon and oxygen atoms per molecule, but not an alkoxy group.

2. The adhesive composition of claim 1, wherein component (A) is a linear polyfluoro compound represented by formula (1):

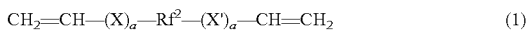

$$CH_2=CH-(X)_a-Rf^2-(X')_a-CH=CH_2 \quad (1)$$

wherein:
X is $-CH_2-$, $-CH_2O-$, $-CH_2OCH_2-$ or $-Y-NR^1-CO-$, wherein Y is $-CH_2-$ or an o-, m-, or p-dimethylsilylphenylene group represented by formula (2):

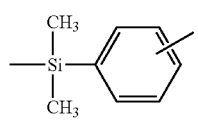

(2)

and $R^1$ is hydrogen or a substituted or unsubstituted monovalent hydrocarbon group,
X' is $-CH_2-$, $-OCH_2-$, $-CH_2OCH_2-$ or $-CO-NR^1-Y'-$, wherein Y' is $-CH_2-$ or an o-, m-, or p-dimethylsilylphenylene group represented by formula (3):

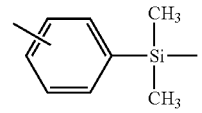

(3)

and $R^1$ is as defined above,
a is independently 0 or 1, and
$Rf^2$ is a divalent perfluoropolyether group represented by formula (4) or (5):

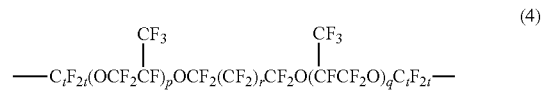

$$-C_tF_{2t}(OCF_2CF)_pOCF_2(CF_2)_rCF_2O(CFCF_2O)_qC_tF_{2t}- \quad (4)$$

wherein p and q each are an integer from 1 to 150, the sum p+q is from 2 to 200, r is an integer from 0 to 6, and t is 2 or 3,

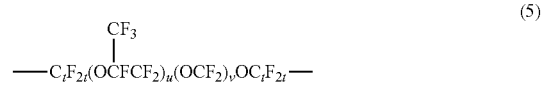

$$-C_tF_{2t}(OCFCF_2)_u(OCF_2)_vOC_tF_{2t}- \quad (5)$$

wherein u is an integer from 1 to 200, v is an integer from 1 to 50, and t is as defined above.

3. The adhesive composition of claim 2, wherein the organosiloxane (F) has at least one monovalent perfluoroalkyl or monovalent perfluorooxyalkyl group which is bonded to a silicon atom through a carbon atom or through carbon and oxygen atoms.

4. The adhesive composition of claim 1, wherein the linear polyfluoro compound (A) has an alkenyl content of 0.002 to 0.3 mol/100 g.

5. The adhesive composition of claim 4, wherein the organosiloxane (F) has at least one monovalent perfluoroalkyl or monovalent perfluorooxyalkyl group which is bonded to a silicon atom through a carbon atom or through carbon and oxygen atoms.

6. The adhesive composition of claim 4, wherein component (A) is a linear polyfluoro compound represented by formula (1):

$$CH_2=CH-(X)_a-Rf^2-(X')_a-CH=CH_2 \quad (1)$$

wherein:
X is $-CH_2-$, $-CH_2O-$, $-CH_2OCH_2-$ or $-Y-NR^1-OO-$, wherein Y is $-CH_2-$ or an o-, m-, or p-dimethylsilylphenylene group represented by formula (2):

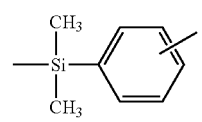

(2)

and $R^1$ is hydrogen or a substituted or unsubstituted monovalent hydrocarbon group,
X' is $-CH_2-$, $-OCH_2-$, $-CH_2OCH_2-$ or $-CO-NR^1-Y'-$, wherein Y' is $-CH_2-$ or an o-, m-, or p-dimethylsilylphenylene group represented by formula (3):

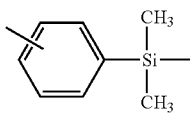

and R¹ is as defined above,
a is independently 0 or 1, and
Rf² is a divalent perfluoropolyether group represented by formula (4) or (5):

wherein p and q each are an Integer from 1 to 150, the sum p+q is from 2 to 200, r is an integer from 0 to 6, and t is 2 or 3,

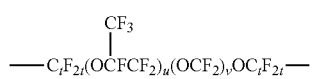

wherein u is an integer from 1 to 200, v is an integer from 1 to 50, and t is as defined above.

7. The adhesive composition of claim 1, wherein the fluorinated organohydrogensiloxane (B) contains at least one monovalent perfluoroalkyl, monovalent perfluorooxyalkyl, divalent perfluoroalkylene or divalent perfluorooxyalkylene group per molecule.

8. The adhesive composition of claim 7, wherein the organosiloxane (F) has at least one monovalent perfluoroalkyl or monovalent perfluorooxyalkyl group which is bonded to a silicon atom through a carbon atom or through carbon and oxygen atoms.

9. The adhesive composition of claim 7, wherein component (A) is a linear polyfluoro compound represented by formula (1):

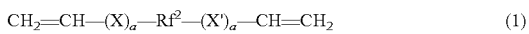

wherein:
X is —CH₂—, —CH₂O—, —CH₂OCH₂— or —Y—NR¹—CO—, wherein Y is —CH₂— or an o-, m-, or p-dimethylsilylphenylene group represented by formula (2):

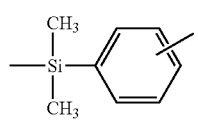

and R¹ is hydrogen or a substituted or unsubstituted monovalent hydrocarbon group,
X' is —CH₂—, —OCH₂—, —CH₂OCH₂— or —CO—NR¹—Y'—, wherein Y' is —CH₂— or an o-, m-, or p-dimethylsilylphenylene group represented by formula (3):

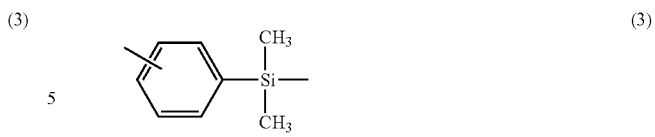

and R¹ is as defined above,
a is independently 0 or 1, and
Rf² is a divalent perfluoropolyether group represented by formula (4) or (5):

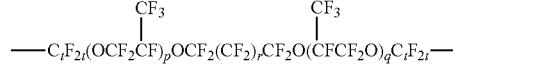

wherein p and q each are an integer from 1 to 150, the sum p+q is from 2 to 200, r is an integer from 0 to 6, and t is 2 or 3,

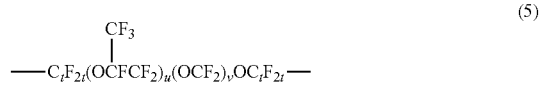

wherein u is an integer from 1 to 200, v is an integer from 1 to 50, and t is as defined above.

10. The adhesive composition of claim 7, wherein the linear polyfluoro compound (A) has an alkenyl content of 0.002 to 0.3 mol/100 g.

11. The adhesive composition of claim 1, wherein the organosilicon compound (D) is an organosiloxane having at least one alkoxysilyl group which is bonded to a silicon atom through a carbon atom or through carbon and oxygen atoms or a trialkoxysilane.

12. The adhesive composition of claim 11, wherein the organosiloxane (F) has at least one monovalent perfluoroalkyl or monovalent perfluorooxyalkyl group which is bonded to a silicon atom through a carbon atom or through carbon and oxygen atoms.

13. The adhesive composition of claim 11, wherein component (A) is a linear polyfluoro compound represented by formula (1):

wherein:
X is —CH₂—, —CH₂O—, —CH₂OCH₂— or —Y—NR¹—CO—, wherein Y is —CH₂— or an o-, m-, or p-dimethylsilylphenylene group represented by formula (2):

and R¹ is hydrogen or a substituted or unsubstituted monovalent hydrocarbon group,
X' is —CH₂—, —OCH₂—, —CH₂OCH₂— or —CO—NR¹—Y'—, wherein Y' is —CH₂— or an o-, m-, or p-dimethylsilylphenylene group represented by formula (3):

(3)

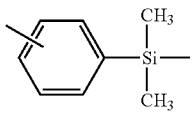

and R¹ is as defined above,
a is independently 0 or 1, and
Rf² is a divalent perfluoropolyether group represented by formula (4) or (5):

(4)

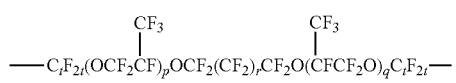

wherein p and q each are an integer from 1 to 150, the sum p+q is from 2 to 200, r is an integer from 0 to 6, and t is 2 or 3, (5)

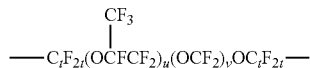

wherein u is an integer from 1 to 200, v is an integer from 1 to 50, and t is as defined above.

14. The adhesive composition of claim 11, wherein the linear polyfluoro compound (A) has an alkenyl content of 0.002 to 0.3 mol/100 g.

15. The adhesive composition of claim 1, wherein the hydrolytic catalyst (E) is an organotitanium compound, organozirconium compound, organotin compound, or organoaluminum compound.

16. The adhesive composition of claim 15, wherein the organosiloxane (F) has at least one monovalent perfluoroalkyl or monovalent perfluorooxyalkyl group which is bonded to a silicon atom through a carbon atom or through carbon and oxygen atoms.

17. The adhesive composition of claim 15, wherein component (A) is a linear polyfluoro compound represented by formula (1):

$$CH_2=CH-(X)_a-Rf^2-(X')_a-CH=CH_2 \quad (1)$$

wherein:
X is —CH₂—, —CH₂O—, —CH₂OCH₂— or —Y—NR¹—CO—, wherein Y is —CH₂— or an o-, m-, or p-dimethylsilylphenylene group represented by formula (2):

(2)

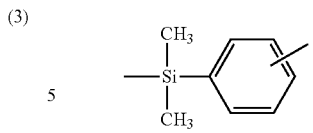

and R¹ is hydrogen or a substituted or unsubstituted monovalent hydrocarbon group,
X' is —CH₂—, —OCH₂—, —CH₂OCH₂— or —CO—NR¹—Y'—, wherein Y' is —CH₂— or an o-, m-, or p-dimethylsilylphenylene group represented by formula (3):

(3)

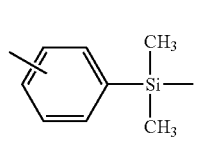

and R¹ is as defined above,
a is independently 0 or 1, and
Rf² is a divalent perfluoropolyether group represented by formula (4) or (5):

(4)

wherein p and q each are an integer from 1 to 150, the sum p+q is from 2 to 200, r is an integer from 0 to 6, and t is 2 or 3, (5)

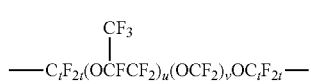

wherein u is an integer from 1 to 200, v is an integer from 1 to 50, and t is as defined above.

18. The adhesive composition of claim 15, wherein the linear polyfluoro compound (A) has an alkenyl content of 0.002 to 0.3 mol/100 g.

19. The adhesive composition of claim 1, wherein the organosiloxane (F) has at least one monovalent perfluoroalkyl or monovalent perfluorooxyalkyl group which is bonded to a silicon atom through a carbon atom or through carbon and oxygen atoms.

* * * * *